(12) United States Patent
Morris et al.

(10) Patent No.: US 9,481,317 B2
(45) Date of Patent: Nov. 1, 2016

(54) ELASTICALLY DEFORMABLE CLIP AND METHOD

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US); Jeffrey M. Gace, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 223 days.

(21) Appl. No.: 14/081,361

(22) Filed: Nov. 15, 2013

(65) Prior Publication Data

US 2015/0135509 A1    May 21, 2015

(51) Int. Cl.
| | |
|---|---|
| *F16B 2/22* | (2006.01) |
| *B60R 1/00* | (2006.01) |
| *F16B 17/00* | (2006.01) |
| *B60R 11/00* | (2006.01) |
| *F16B 5/06* | (2006.01) |
| *F16B 21/08* | (2006.01) |

(52) U.S. Cl.
CPC ............. *B60R 11/00* (2013.01); *F16B 5/0664* (2013.01); *F16B 21/086* (2013.01); *B60R 2011/0043* (2013.01); *Y10T 24/44026* (2015.01); *Y10T 29/49876* (2015.01); *Y10T 29/49925* (2015.01)

(58) Field of Classification Search
CPC ........... B60R 11/00; B60R 2011/0043; F16B 5/0664; F16B 21/086; Y10T 29/49925; Y10T 29/49876; Y10T 24/44026
See application file for complete search history.

(56) References Cited

U.S. PATENT DOCUMENTS

| | | |
|---|---|---|
| 419,358 A | 1/1890 | Raymond et al. |
| 1,219,398 A | 3/1917 | Huntsman |
| 1,261,036 A | 4/1918 | Kerns |
| 1,301,302 A | 4/1919 | Nolan |

(Continued)

FOREIGN PATENT DOCUMENTS

| | | |
|---|---|---|
| BE | 842302 A | 9/1976 |
| CN | 1036250 A | 10/1989 |

(Continued)

OTHER PUBLICATIONS

U.S. Appl. No. 13/939,503, filed Jul. 11, 2013, entitled "Elastically Averaged Alignment Systems and Methods," inventor: Joel Colombo.

(Continued)

*Primary Examiner* — John C Hong
(74) *Attorney, Agent, or Firm* — Cantor Colburn LLP

(57) ABSTRACT

An elastically deformable clip includes a first and second outer wall arranged substantially parallel to each other, each of the first outer wall and the second outer wall having an inner surface, an outer surface, a first edge and a second edge arranged substantially parallel, and a third edge and a fourth edge arranged substantially parallel. The clip also includes at least one inner wall extending between the inner surfaces of the first and second outer walls, the at least one inner wall having at least one slot, wherein the first outer wall, the second outer wall and the at least one inner wall are formed of an elastically deformable material. The clip further includes a rib protruding from the outer surface of at least one of the first and second outer walls, the rib arranged substantially parallel to the first edge and the second edge.

12 Claims, 4 Drawing Sheets

(56) References Cited

U.S. PATENT DOCUMENTS

| | | |
|---|---|---|
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A * | 10/1974 | Brown .................... B60R 13/04 16/86 R |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,481,160 A | 11/1984 | Bree |
| 4,527,760 A | 7/1985 | Salacuse |
| 4,575,060 A | 3/1986 | Kitagawa |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | Demaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A | 2/1997 | Horchler |
| 5,629,823 A | 5/1997 | Mizuta |
| 5,634,757 A | 6/1997 | Schanz |
| 5,657,516 A | 8/1997 | Berg et al. |
| 5,667,271 A | 9/1997 | Booth |
| 5,670,013 A | 9/1997 | Huang et al. |
| 5,698,276 A | 12/1997 | Mirabitur |

(56) References Cited

U.S. PATENT DOCUMENTS

| | | |
|---|---|---|
| 5,706,559 A | 1/1998 | Oliver |
| 5,736,221 A | 4/1998 | Hardigg et al. |
| 5,765,942 A | 6/1998 | Shirai et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,289,560 B1 | 9/2001 | Guyot |
| 6,299,478 B1 | 10/2001 | Jones et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |

(56) References Cited

U.S. PATENT DOCUMENTS

| | | |
|---|---|---|
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |

(56) References Cited

U.S. PATENT DOCUMENTS

| | | |
|---|---|---|
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0078805 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 200941716 Y | 8/2007 |
| CN | 101250964 A | 8/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202079532 U | 12/2011 |
| CN | 102313952 A | 1/2012 |
| CN | 202132326U U | 2/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 203189459 U | 9/2013 |
| CN | 203344856 U | 12/2013 |
| CN | 203991175 U | 12/2014 |
| DE | 1220673 B | 7/1966 |
| DE | 2527023 A1 | 12/1976 |
| DE | 2736012 A1 | 2/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |

(56) References Cited

FOREIGN PATENT DOCUMENTS

| | | |
|---|---|---|
| GB | 2281950 A | 3/1995 |
| JP | H08200420 A | 8/1996 |
| JP | H0942233 A | 2/1997 |
| JP | 2000010514 A | 1/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

U.S. Appl. No. 13/940,912, filed Jul. 12, 2013, entitled "Alignment Arrangement for Mated Components and Method", inventors: Steven E. Morris and Jennifer P. Lawall.

U.S. Appl. No. 13/945,231, filed Jul. 18, 2013, entitled "Lobular Elastic Tube Alignment System for Providing Precise Four-Way Alignment of Components", Inventors: Steven E. Morris and Jennifer P. Lawall.

U.S. Appl. No. 13/954,198, filed Jul. 30, 2013, entitled "Elastic Alignment and Retention System and Method," inventors: Steven E Morris, Edward D. Groninger, and Raymond J. Chess.

U.S. Appl. No. 13/966,523, filed Aug. 14, 2013, entitled "Elastically Averaged Alignment Systems and Methods Thereof," inventors: Steven E. Morris, Jennifer P. Lawall and Joel Colombo.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap Member Aligning and Fastening System", inventors: Steven E. Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

U.S. Appl. No. 14/021,282, filed Sep. 9, 2013, entitled "Elastic Tube Alignment and Fastening System for Providing Precise Alignment and Fastening of Components," inventors: Steven E. Morris and Jennifer P. Lawall.

U.S. Appl. No. 14/031,647, filed Sep. 19, 2013, entitled "Elastically Averaged Alignment Systems and Methods," inventors: Steven E. Morris, Joel Colombo, Jennifer P. Lawall, Jeffrey L. Konchan, and Steve J. Briggs.

U.S. Appl. No. 14/038,241, filed Sep. 26, 2013, entitled "Serviceable Aligning and Self-Retaining Elastic Arrangement for Mated Components and Method," inventors: Steven E. Morris, Jennifer P. Lawall and Joel Colombo.

U.S. Appl. No. 14/039,614, filed Sep. 27, 2013, entitled "Elastically Averaged Alignment Systems and Methods," inventor: Steven E. Morris.

U.S. Appl. No. 14/044,199, filed Oct. 2, 2013, entitled "Lobular Elastic Tube Alignment and Retention System for Providing Precise Alignment of Components," inventors: Steven E. Morris and Jennifer P. Lawall.

U.S. Appl. No. 14/044,207, filed Oct. 2, 2013, entitled "Elastic Aperture Alignment System for Providing Precise Four-Way Alignment of Components," inventors: Steven E. Morris and Jennifer P. Lawall.

U.S. Appl. No. 14/045,463, filed Oct. 3, 2013, entitled "Elastically Averaged Alignment Systems and Methods," inventors: Steven E. Morris and Jennifer P. Lawall.

U.S. Appl. No. 14/081,361, filed Nov. 15, 2013, entitled "Elastically Deformable Clip and Method," inventors: Steven E. Morris, Jennifer P. Lawall and Jeffrey M. Gace.

U.S. Appl. No. 14/104,321, filed Dec. 12, 2013, entitled "Alignment and Retention System for a Flexible Assembly," inventors: Steven E. Morris and Jennifer P. Lawall.

U.S. Appl. No. 14/104,327, filed Dec. 12, 2013, entitled "Self-Retaining Alignment System for Providing Precise Alignment and Retention of Components," inventors: Steven E. Morris, Jennifer P. Lawall and Toure D. Lee.

U.S. Appl. No. 14/104,333, filed Dec. 12, 2013, entitled "Alignment System for Providing Precise Alignment and Retention of Components of a Sealable Compartment," inventors: Steven E. Morris, Christopher J. Georgi, Jennifer P. Lawall and Gordan N. Noll.

U.S. Appl. No. 14/104,541, filed Dec. 12, 2013, entitled "Alignment and Retention System for Providing Precise Alignment and Retention of Components," inventors: Steven E. Morris and Jennifer P. Lawall.

U.S. Appl. No. 14/104,549, filed Dec. 12, 2013, entitled "Alignment System for Providing Alignment of Components Having Contoured Features," inventors: Steven E. Morris and Jennifer P. Lawall.

U.S. Appl. No. 14/108,921, filed Dec. 17, 2013, entitled "Elastically Averaged Alignment Systems and Methods Thereof," inventors: Steven E. Morris and Jennifer P. Lawall.

U.S. Appl. No. 14/108,931, filed Dec. 17, 2013, entitled "Elastically Averaged Strap Systems and Methods," inventors: Steven E. Morris and Jennifer P. Lawall.

U.S. Appl. No. 14/109,296, filed Dec. 17, 2013, entitled "Fastener for Operatively Coupling Matable Components," inventors: Steven E. Morris and Jennifer P. Lawall.

U.S. Appl. No. 14/134,622, filed Dec. 19, 2013, entitled "Elastic Averaging Alignment Member," inventors: Steven E. Morris and Jennifer P. Lawall.

U.S. Appl. No. 14/134,801, filed Dec. 19, 2013, entitled "Elastically Averaged Alignment Systems and Methods," inventors: Steven E. Morris and Jennifer P. Lawall.

U.S. Appl. No. 14/134,844, filed Dec. 19, 2013, entitled "Elastically Deformable Module Installation Assembly," inventors: Steven E. Morris and Jennifer P. Lawall.

U.S. Appl. No. 14/134,888, filed Dec. 19, 2013, entitled "Elastic Retaining Assembly and Method," inventors: Steven E. Morris and Jennifer P. Lawall.

U.S. Appl. No. 14/136,502, filed Dec. 20, 2013, entitled "Elastically Averaged Alignment Systems and Methods," inventors: Timothy A. Kiester, Steven E. Morris, Kenton L. West, Scott J. Fast, and Evan Phillips.

U.S. Appl. No. 14/151,279, filed Jan. 9, 2014, entitled "Elastically Averaged Alignment Systems and Methods," inventors: Steven E. Morris and Jennifer P. Lawall.

U.S. Appl. No. 14/153,741, filed on Jan. 13, 2014, entitled "Elastically Averaged Assembly for Closure Applications," inventors: Steven E. Morris, Jeffrey A. Abell, Jennifer P. Lawall, and Jeffrey L. Konchan.

U.S. Appl. No. 14/180,882, filed Feb. 14, 2014, entitled "Elastic Tube Alignment System for Precisely Locating Components," inventor: Steven E. Morris.

U.S. Appl. No. 14/181,142, filed Feb. 14, 2014, entitled "Elastic Tube Alignment System for Precisely Locating Components," inventor: Steven E. Morris.

(56) References Cited

OTHER PUBLICATIONS

U.S. Appl. No. 14/185,422, filed Feb. 20, 2014, entitled "Elastically Averaged Alignment Systems and Methods," inventors: Joel Colombo, Steven E. Morris, Jennifer P. Lawall and Ashish M. Gollapalli.
U.S. Appl. No. 14/185,472, filed Feb. 20, 2014, entitled "Elastically Averaged Alignment Systems and Method," inventors: Steven E. Morris, Jennifer P. Lawall and Kee Hyuk Im.
U.S. Appl. No. 14/231,395, filed Mar. 31, 2014, entitled "Elastically Averaged Alignment Systems and Methods," inventors: Joel Colombo, Steven E. Morris, Jennifer P. Lawall, and Ashish M. Gollapalli.
U.S. Appl. No. 14/249,746, filed on Apr. 10, 2014, entitled "Elastically Averaged Alignment Systems and Methods," inventors: Joel Colombo and Catherine A. Ostrander.
U.S. Appl. No. 14/259,747, filed Apr. 23, 2014, entitled "System for Elastically Averaging Assembly of Components," inventors: Steven E. Morris and Jennifer P. Lawall.
Cross-sectional view of a prior art infrared welded assembly of BMW, Munich, Germany. Believed on the market since about Jan. 1, 2010.
"Elastic Averaging in Flexture Mechanisms: A Multi-Beam Paralleaogram Flexture Case-Study" by Shorya Awtar and Edip Sevincer, Proceedings of IDETC/CIE 2006, Paper DETC2006-99752, American Society of Mechanical Engineers (ASME), Sep. 2006.
"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.
"The Design of High Precision Parallel Mechnisms Using Binary Actuation and Elastic Averaging: With Application to MRI Cancer Treatment" by L.M. Devita, J.S. Plante, and S. Dubowsky, 12th IFToMM World Congress (France), Jun. 2007.
"Passive Alignment of Micro-Fluidic Chips Using the Principle of Elastic Averaging" by Sitanshu Gurung, Thesis, Louisiana State University, Dept. of Mechanical Engineering, Dec. 2007.
"Precision Connector Assembly Using Elastic Averaging" by Patrick J. Willoughby and Alexander H. Slocum, Massachusetts Institute of Technology (MIT), Cambridge, MA, American Society for Precision Engineering, 2004.
U.S. Appl. No. 13/229,926, filed Sep. 12, 2011, entitled "Using Elastic Averaging for Alignment of Battery Stack, Fuel Cell Stack, or Other Vehicle Assembly", inventors: Mark A. Smith, Ronald Daul, Xiang Zhao, David Okonski, Elmer Santos, Lane Lindstrom, and Jeffrey A. Abell.
U.S. Appl. No. 13/330,718, filed Dec. 20, 2011, entitled "Precisely Locating Components in an Infrared Welded Assembly", inventor: Steven E. Morris.
U.S. Appl. No. 13/459,118, filed Apr. 28, 2012, entitled "Stiffened Multi-Layer Compartment Door Assembly Utilizing Elastic Averaging," inventor: Steven E. Morris.
U.S. Appl. No. 13/567,580, filed Aug. 6, 2012, entitled "Semi-Circular Alignment Features of an Elastic Averaging Alignment System", inventors: Steven E. Morris and Thomas F. Bowles.
U.S. Appl. No. 13/570,959, filed Aug. 9, 2012, entitled "Elastic Cantilever Beam Alignment System for Precisely Aligning Components", inventor: Steven E. Morris.
U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.
U.S. Appl. No. 13/752,449, filed Jan. 29, 2013, entitled "Elastic Insert Alignment Assembly and Method of Reducing Positional Variation", inventors: Steven E. Morris and Michael D. Richardson.
U.S. Appl. No. 13/755,759, filed Jan. 31, 2013, entitled "Elastic Alignment Assembly for Aligning Mated Components and Method of Reducing Positional Variation", inventors: Joel Colombo, Michael D. Richardson, and Steven E. Morris.
U.S. Appl. No. 13/851,222, filed Mar. 27, 2013, entitled "Elastically Averaged Alignment System", inventors: Joel Colombo and Steven E Morris.
U.S. Appl. No. 13/855,928, filed Apr. 3, 2013, entitled "Elastic Averaging Alignment System, Method of Making the Same and Cutting Punch Therefor", inventors: Steven E. Morris, Jennifer P. Lawall, Joel Colombo, and Jeffrey L. Konchan.
U.S. Appl. No. 13/856,888, filed Apr. 4, 2013, entitled "Elastic Retaining Assembly for Matable Components and Method of Assembling", inventors: Steven E. Morris, Jennifer P. Lawall, Joel Colombo, and Toure D. Lee.
U.S. Appl. No. 13/856,927, filed Apr. 4, 2013, entitled "Elastic Tubular Attachment Assembly for Mating Components and Method of Mating Components", inventors: Steven E. Morris and Jennifer P. Lawall.
U.S. Appl. No. 13/856,956, filed Apr. 4, 2013, entitled "Elastic Clip Retaining Arrangement and Method of Mating Structures with an Elastic Clip Retaining Arrangement", inventors: Joel Colombo, Steven E. Morris and Jeffrey L. Konchan.
U.S. Appl. No. 13/856,973, filed Apr. 4, 2013, entitled "Elastically Deformable Flange Locator Arrangement and Method of Reducing Positional Variation", inventors: Joel Colombo, Steven E. Morris and Michael D. Richardson.
U.S. Appl. No. 13/858,478, filed Apr. 8, 2013, entitled "Elastic Mating Assembly and Method of Elastically Assembling Matable Components", inventors: Steven E. Morris and Jennifer P. Lawall.
U.S. Appl. No. 13/859,109, filed Apr. 9, 2013, entitled "Elastic Retaining Arrangement for Jointed Components and Method of Reducing a Gap Between Jointed Components," inventors: Steven E. Morris, James M. Kushner, Victoria L. Enyedy, Jennifer P. Lawall, and Piotr J. Ogonek.
U.S. Appl. No. 13/915,132, filed Jun. 11, 2013, entitled "Elastically Deformable Energy Management Arrangement and Method of Managing Energy Absorption," inventors: Steven E. Morris, Randy A. Johnson and Jennifer P. Lawall.
U.S. Appl. No. 13/915,177, filed Jun. 11, 2013, entitled "Elastically Deformable Energy Management Assembly and Method of Managing Energy Absorption," inventors: Steven E. Morris, Jennifer P. Lawall, and Randy Johnson.
U.S. Appl. No. 13/917,005, filed Jun. 13, 2013, entitled "Elastic Attachment Assembly and Method of Reducing Positional Variation and Increasing Stiffness," inventors: Steven E. Morris and Jennifer P. Lawall.
U.S. Appl. No. 13/917,074, filed Jun. 13, 2013, entitled "Elastically Deformable Retaining Hook for Components to be Mated Together and Method of Assembling", inventors: Joel Colombo, Jeffrey L. Konchan, Steven E. Morris, and Steve J. Briggs.
U.S. Appl. No. 13/918,183, filed Jun. 14, 2013, entitled "Elastic Retaining Assembly for Matable Components and Method of Assembling," inventors: Steven E. Morris and Jennifer P. Lawall.
"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.
Rojas, F.E., et al., "Kinematic Coupling for Precision Fixturing & Assembly" MIT Precision Engineering Research Group, Apr. 2013.
Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013.
Willoughby, P., "Elastically Averaged Precision Alignment", Degree of Doctor of Philosophy in Mechanical Engineering Dissertation, Massachusetts Institute of Technology, 2005.
Office Action regarding related CN App. No. 20140643955.9; dated Mar. 2, 2016; 6 pgs.

* cited by examiner

ELASTICALLY DEFORMABLE CLIP AND METHOD

FIELD OF THE INVENTION

The invention relates to components to be mated together and, more particularly, to an elastically deformable clip for a clip assembly, as well as a method of mating and retaining components with the elastically deformable clip.

BACKGROUND

Currently, components which are to be mated together in a manufacturing process are subject to positional variation based on the mating arrangements between the components. One common arrangement includes components mutually located with respect to each other by 2-way and/or 4-way male alignment features; typically undersized male structures which are received into corresponding oversized female alignment features such as apertures in the form of openings and/or slots. Alternatively, double-sided tape, adhesives or welding processes may be employed to mate parts. Irrespective of the precise mating arrangement, there is a clearance between at least a portion of the alignment features which is predetermined to match anticipated size and positional variation tolerances of the mating features as a result of manufacturing (or fabrication) variances. As a result, occurrence of significant positional variation between the mated components is possible, which may contribute to the presence of undesirably large and varying gaps and otherwise poor fit. The clearance between the aligning and attaching features may lead to relative motion between mated components, which may contribute to poor perceived quality. Additional undesirable effects may include squeaking and rattling of the mated components, for example.

SUMMARY OF THE INVENTION

In one exemplary embodiment, a clip assembly having an elastically deformable clip is provided. The elastically deformable clip includes a first outer wall and a second outer wall arranged substantially parallel to each other, each of the first outer wall and the second outer wall having an inner surface, an outer surface, a first edge and a second edge arranged substantially parallel to each other, and a third edge and a fourth edge arranged substantially parallel to each other. The clip also includes at least one inner wall extending between the inner surfaces of the first outer wall and the second outer wall, the at least one inner wall having at least one slot, wherein the first outer wall, the second outer wall and the at least one inner wall are formed of an elastically deformable material. The clip further includes a rib protruding from the outer surface of at least one of the first outer wall and the second outer wall, the rib arranged substantially parallel to the first edge and the second edge.

In another exemplary embodiment, clip assembly having an elastically deformable clip is provided. The elastically deformable clip includes a first outer wall and a second outer wall arranged substantially parallel to each other, each of the first outer wall and the second outer wall having an inner surface, an outer surface, a first edge and a second edge arranged substantially parallel to each other, and a third edge and a fourth edge arranged substantially parallel to each other. The clip also includes at least one inner wall extending between the inner surfaces of the first outer wall and the second outer wall. The clip further includes a first rib protruding from the outer surface of at least one of the first outer wall and the second outer wall, the first rib arranged substantially parallel to the third edge and disposed in close proximity to the third edge. The clip yet further includes a second rib protruding from the outer surface of at least one of the first outer wall and the second outer wall, the rib arranged substantially parallel to the fourth edge and disposed in close proximity to the fourth edge.

In yet another exemplary embodiment, a method of mating components is provided. The method includes aligning a component having an aperture with an elastically deformable clip having an H-shaped geometry formed of an inner wall and a pair of outer walls. The method also includes translating the elastically deformable clip within the aperture. The method further includes engaging a rib protruding from an outer surface of at least one of the outer walls with an aperture wall. The method yet further includes elastically deforming the inner wall upon translation of the elastically deformable clip. The method also includes snap-fitting the elastically deformable clip into a fully engaged position upon translation of the rib to an over-center position of the rib with the aperture wall.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
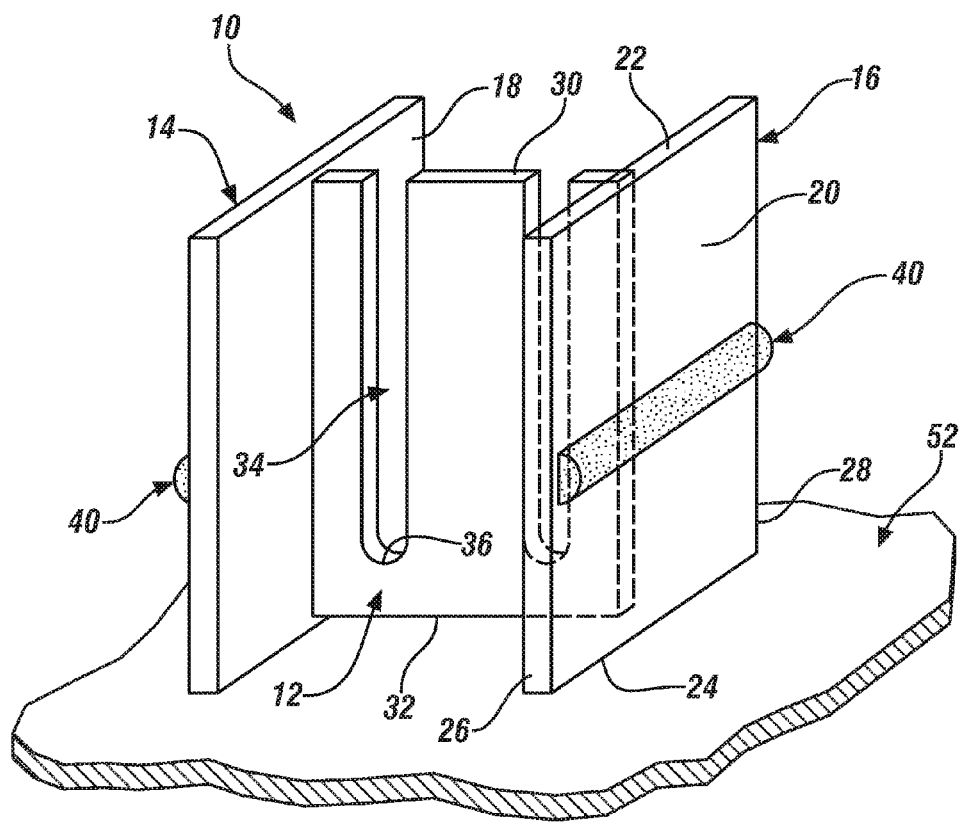
FIG. 1 is a perspective view of an elastically deformable clip according to a first embodiment.

The following description is merely exemplary in nature and is not intended to limit the present disclosure, its application or uses. For example, the embodiments shown are applicable to vehicle interior component assemblies, such as garnish moldings and trim components, but the embodiments disclosed herein may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

Referring to FIG. 1, an elastically deformable clip 10 according to a first embodiment is illustrated. The elastically deformable clip 10 includes an inner wall 12 extending between, and connecting, a first outer wall 14 and a second outer wall 16. In particular, the inner wall 12 contacts and extends between an inner surface 18 of the outer walls 14, 16. In addition to the inner surface 18, both outer walls 14, 16 include an outer surface 20, a first edge 22, a second edge 24, a third edge 26 and a fourth edge 28. The outer walls 14, 16 in the illustrated embodiment each have a substantially parallelogram geometry, such as a square or rectangle, for example. In particular, the first edge 22 and the second edge 24 are arranged substantially parallel to each other, with the third edge 26 and the fourth edge 28 arranged substantially parallel to each other. Although illustrated and described above as a parallelogram, it is to be understood that the geometry of the outer walls 14, 16 may deviate from that shown in the exemplary embodiment. Additionally, the outer walls 14, 16 may be formed of geometries distinct from each other. In one embodiment, in combination, the inner wall 12 and the outer walls 14, 16 form a substantially H-shaped geometry, but alternative orientations are contemplated.

The inner wall 12 includes a first edge 30 and a second edge 32 that typically correspond to common respective planes of the first edge 22 and the second edge 24 of the outer walls 14, 16, but the precise location of the first and second edges 30, 32 of the inner wall 12 may vary relative to the edges 22, 24 of the outer walls 14, 16. At least one slot 34 is included in the inner wall 12. In the illustrated embodiment, two slots are shown; however, it is to be appreciated that any number of slots may be employed, depending on the desired flexibility of the overall elastically deformable clip 10, as will be appreciated from the description below. The at least one slot 34 extends from the first edge 30 of the inner wall 12 to a terminal end 36.

Protruding from the outer surface 20 of at least one of the outer walls 14, 16 is a rib 40. For purposes of discussion, the rib 40 is shown and described as being included along the second outer wall 16, but it is to be appreciated that either or both outer wall 14, 16, or any additional portion around the perimeter of the outer walls 14, 16, may include the rib 40. Although it is contemplated that the rib 40 is merely assembled with the outer wall 16, typically the rib 40 is integrally formed with the outer wall 16. Furthermore, the inner wall 12 may be operatively coupled to the outer walls 14, 16, but typically the entire elastically deformable clip 10 is integrally formed as a single molded component. The ribs 40 are aligned in a substantially parallel manner with the first edge 22 and the second edge 24 of the outer walls 14, 16. The ribs 40 may fully extend from the third edge 26 to the fourth edge 28 or along intermediate locations therebetween. In one embodiment, the ribs 40 are located approximately equidistant between the first edge 22 and the second edge 24 of the outer walls 14, 16. Irrespective of the precise location of the ribs 40, the terminal end 36 of the at least one slot 34 is disposed closer in proximity to the second edge 24 of the outer wall 16 than that of the rib 40. Positioning in this manner facilitates flexing and/or elastic deformation of one or both of the outer walls 14, 16 during translation along a mating component edge upon insertion of the elastically deformable clip 10 into an aperture, as will be described in detail below. To facilitate insertion, as will be appreciated from the description below, the outer walls 14, 16 and the inner wall 12 may be formed of an elastically deformable material.

Any suitable elastically deformable material may be used for the elastically deformable clip 10. The term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Numerous examples of materials that may at least partially form the components include various metals, polymers, ceramics, inorganic materials or glasses, or composites of any of the aforementioned materials, or any other combinations thereof. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS), such as an ABS acrylic. The material may be in any form and formed or manufactured by any suitable process, including stamped or formed metal, composite or other sheets, forgings, extruded parts, pressed parts, castings, or molded parts and the like, to include the deformable features described herein. The material, or materials, may be selected to provide a predetermined elastic response characteristic of the elastically deformable clip 10. The predetermined elastic response characteristic may include, for example, a predetermined elastic modulus.

Figure 2:
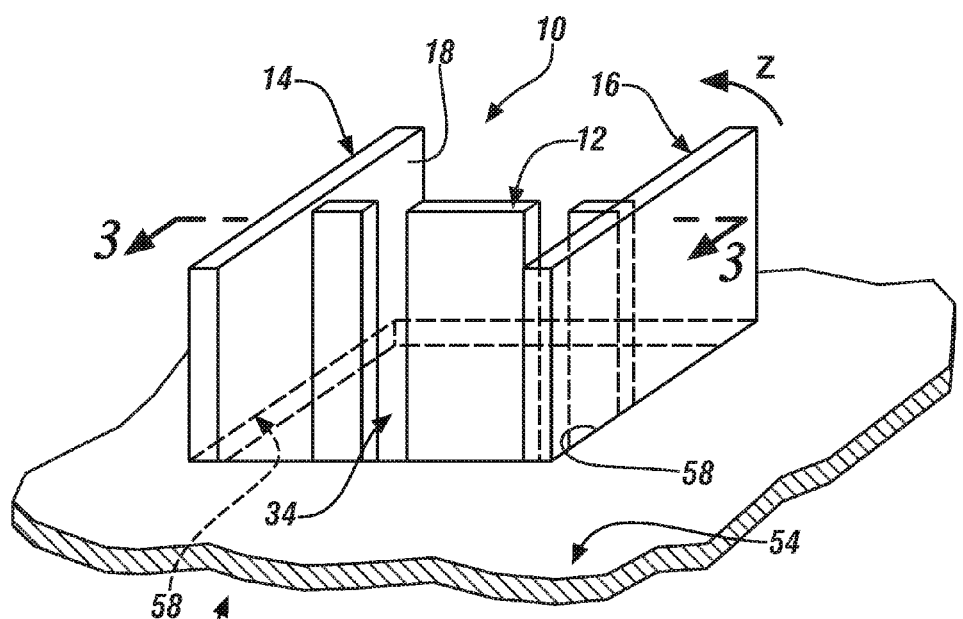
FIG. 2 is a perspective view of the elastically deformable clip of FIG. 1 in a partially engaged position with a component.
Figure 3:
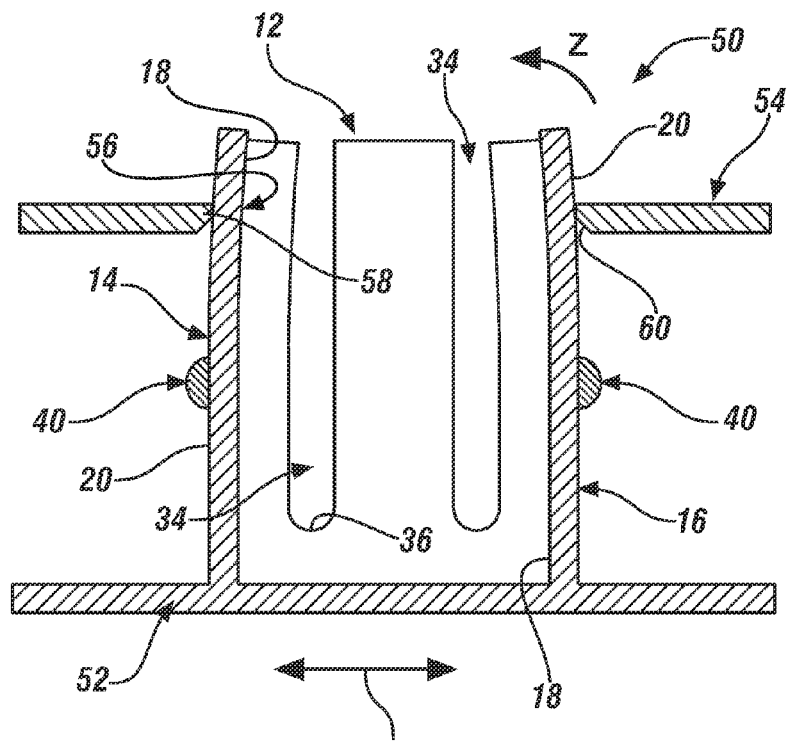
FIG. 3 is a cross-sectional view taken along line 3-3 of FIG. 2 of the elastically deformable clip of FIG. 1 in a partially engaged position with the component.

Referring to FIGS. 2 and 3, the elastically deformable clip 10 is illustrated in use as part of a clip assembly 50 for mating components. Specifically, the clip assembly 50 includes the elastically deformable clip 10, which is operatively coupled to or integrally formed with a first component 52 (FIG. 3), and a second component 54 to be mated with the first component 52. The elastically deformable clip 10 is shown in a partially inserted, or partially engaged, condition, with respect to an aperture 56 defined by an aperture wall 58 formed in the second component 54. At least a portion of the aperture wall 58 includes a chamfered region 60, thereby providing a "lead-in" guide to facilitate initial insertion of the elastically deformable clip 10. As best shown in FIGS.

3 and 4, the outer wall(s) 14, 16 are configured to engage the aperture wall 58 and elastically deform in a flexing manner upon contact with the aperture wall 58 during translation of the elastically deformable clip 10 within the aperture 56. As the outer wall(s) 14, 16 engage the aperture wall 58, the outer walls 14, 16 and a portion of the inner wall 12 rotate inwardly in an elastically deformable manner, thereby compressing the inner wall slots, as shown with directional arrow Z. The deformability of the clip 10 can be appreciated from the description above, as it relates to the material and elastic deformability of the clip 10. The flexibility is further facilitated by the presence of the slots 34 formed in the inner wall 12. The void of material in wall 12 enhances the flexibility of the outer wall(s) 14, 16. Contact between the outer walls 14, 16 and the aperture 58 is ensured by sizing the clip 10 to be larger in a direction X than that of the aperture 56.

Figure 4:
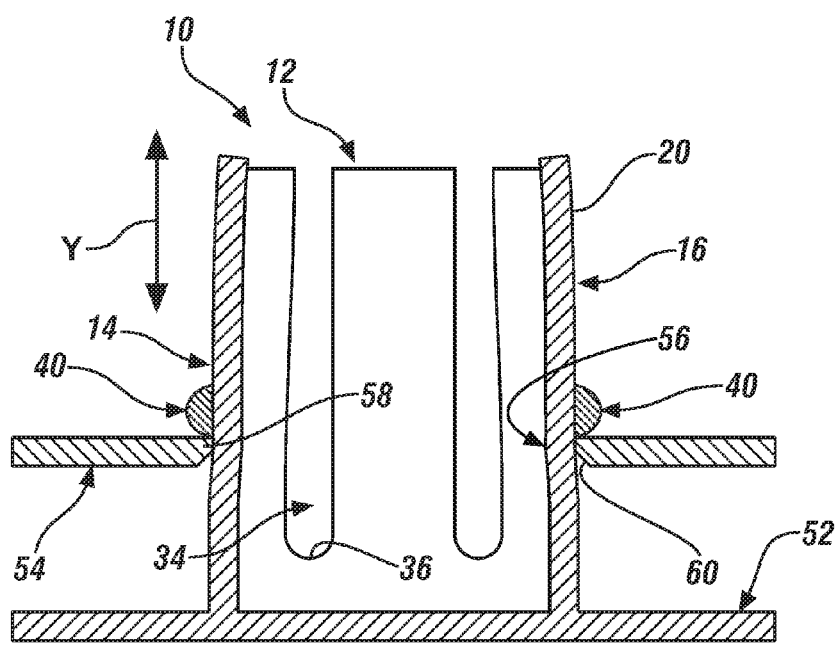
FIG. 4 is a cross-sectional view of the elastically deformable clip of FIG. 1 in a fully engaged position with the component.

Referring now to FIG. 4, the elastically deformable clip 10 is shown in a fully engaged, or inserted, condition. The illustrated condition is achieved upon translation of the clip 10 throughout the aperture 56 in a direction Y. Translation is made until the rib 40 engages, by sliding past the aperture wall 58, to an "over-center" condition. The over-center condition of the rib 40 is defined as more than half of the rib 40 having passed over the aperture wall 58. Upon snap-fitting the clip 10 through the aperture 56, a reliable mating of the first component 52 and the second component 54 is achieved, while eliminating any associated gaps between the clip 10 and the aperture wall 56. It is to be appreciated that a slight interference condition between the rib 40 and the aperture wall 58 is present subsequent to passage of the rib 40 to the over-center condition.

Figure 5:
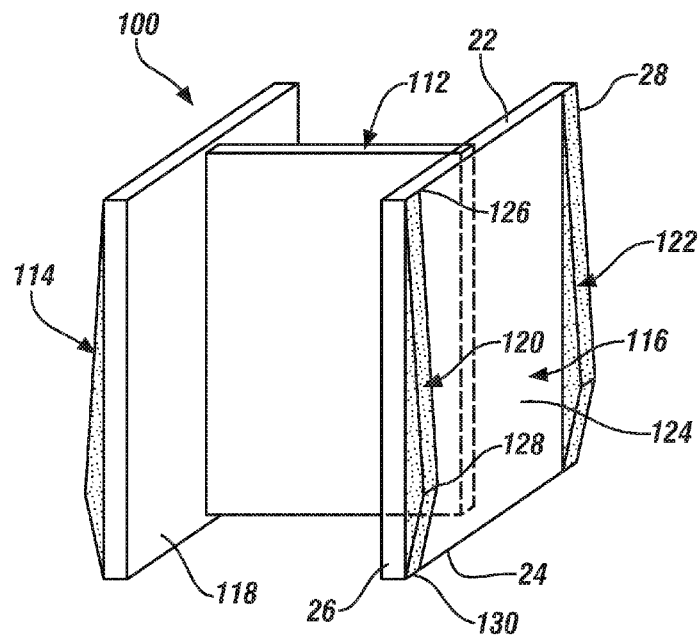
FIG. 5 is a perspective view of the elastically deformable clip according to a second embodiment.

Referring to FIG. 5, an elastically deformable clip 100, according to a second embodiment, is illustrated. The clip 100 is similar in many respects to the first embodiment described in detail above, such that duplicative discussion of similar features and functionality are not necessary. The clip 100 includes an inner wall 112, a first outer wall 114 and a second outer wall 116. As shown, the clip 100 may be formed with an H-shaped geometry, but alternatives are contemplated, as is the case with the first embodiment. The inner wall 112 may comprise a solid member and extends between respective inner surfaces 118 of the outer walls 114, 116. At least one of the outer walls 114, 116 includes a first rib 120 and a second rib 122 protruding from an outer surface 124 of the outer walls 114, 116. Although either or both outer wall may include the ribs, only the second outer wall 116 will be described as having a rib thereon. As with the first embodiment, the outer wall 116 may be formed of an elastically deformable material to facilitate bending of the outer wall 116 upon contact with a mating component, as will be discussed in detail below.

The ribs 120, 122 are arranged substantially parallel to the third edge 26 and the fourth edge 28; however, disposal of the ribs 120, 122 at an angle thereto is contemplated. The first rib 120 is disposed in close proximity to the third edge 26 and the second rib 122 is disposed in close proximity to the fourth edge 28. Each of the ribs 120, 122 may fully extend from the first edge 22 to the second edge 24 or along intermediate locations therebetween. Irrespective of the precise positioning of the ribs 120, 122, each rib extends at an angle from a first end 126 to an intermediate location 128. The intermediate location 128 corresponds to an outermost location of the ribs 120, 122, relative to a distance away from the outer surface 124 of the outer wall 116. The ribs 120, 122 angle inwardly from the intermediate location 128 to a second end 130. The intermediate location 128 provides a clip retention point, as described below.

Figure 6:
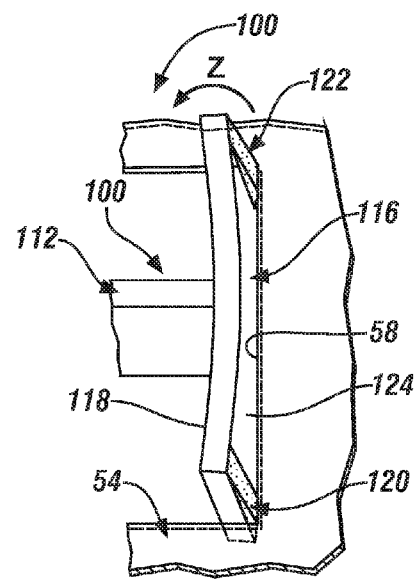
FIG. 6 is a top view of the elastically deformable clip of FIG. 5.
Figure 7:
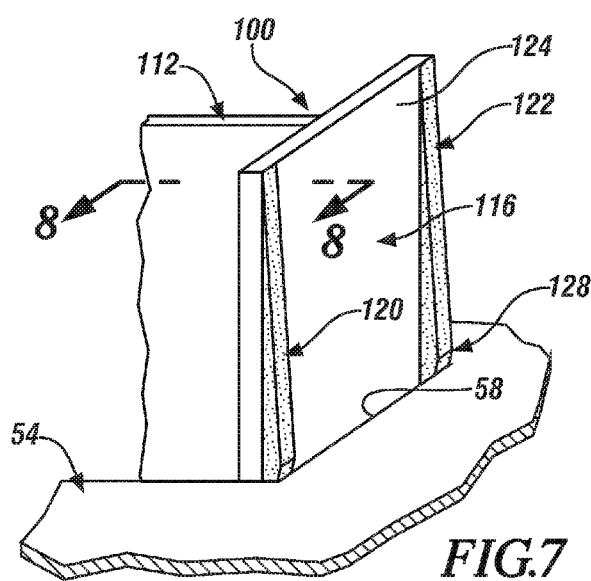
FIG. 7 is a perspective view of the elastically deformable clip of FIG. 5 in a partially engaged position with the component.
Figure 8:
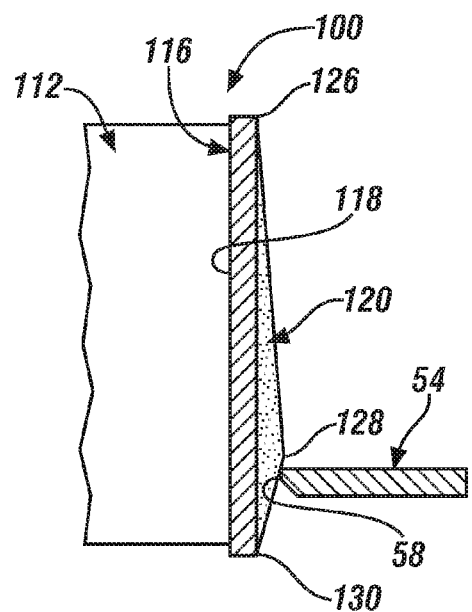
FIG. 8 is a cross-sectional view taken along line 8-8 of FIG. 7 of the elastically deformable clip of FIG. 4 in a fully engaged position with the component.

Referring to FIGS. 6-8, the clip 100 is shown at various stages of engagement with the aperture wall 58 of the second component 54. Specifically, in a partially engaged, or inserted, condition (FIG. 6) of the clip 100, engagement between the ribs 120, 122 biases regions of the outer wall 116 to flex inwardly in an arcuate manner (Z) around the inner wall 112 in an elastically deformable manner. As discussed above, such deformation is achieved by the elastically deformable material from which the clip 100 is constructed. Upon sufficient translation of the clip 100 within the aperture 56, the intermediate location 128 of the ribs 120, 122 "snaps" over the aperture wall 58 and imposes a retention force, thereby mating the first component 52 and the second component 54.

In one embodiment, a plurality of clips 10, 100 are employed to mate the first component 52 to the second component 54. The plurality of clips may be employed within a single aperture or in a plurality of corresponding apertures. In either event, the elastic deformability allows the components to be mated in a precisely aligned manner by "elastically averaging" offsets associated with manufacturing and tolerance issues Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187, 675, now U.S. Publication No. U.S. 2013-0019455, the disclosure of which is incorporated by reference herein in its entirety. The embodiments disclosed above provide the ability to convert an existing component that is not compatible with the above-described elastic averaging principles to an assembly that does facilitate elastic averaging and the benefits associated therewith.

Figure 9:
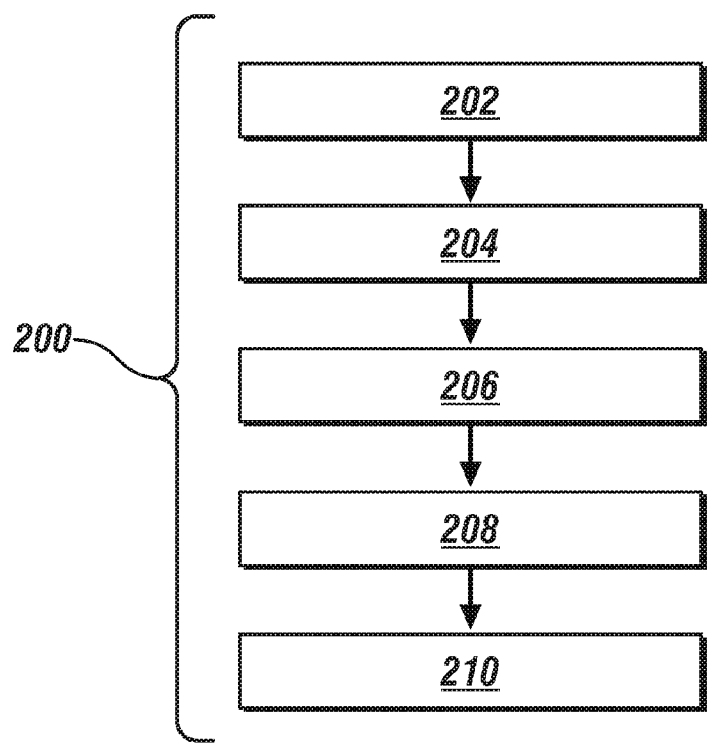
FIG. 9 is a flow diagram illustrating a method of mating components with the elastically deformable clip.

A method of mating components 200 is also provided, as illustrated in FIG. 9, and with reference to FIGS. 1-8. The elastically deformable clip 10, 100, and more specifically the elastically deformable nature of clip, has been previously described and specific structural components need not be described in further detail. The method 200 includes aligning 202 a component having an aperture 56 with the elastically deformable clip 10, 100 having an H-shaped geometry formed of an inner wall 12, 112 and outer walls 14, 16, 114, 116. The elastically deformable clip 10, 100 is translated 204 within the aperture 56. The rib 40, 120, 122, is engaged 206 with the aperture wall 58. At least one of the outer walls are elastically deformed 208 upon translation of the elastically deformable clip until the clip is snap-fitted 210 into a fully engaged position upon translation of the rib to an over-center position of the rib with the aperture wall.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically deformable clip comprising:
   a first outer wall and a second outer wall arranged substantially parallel to each other, each of the first outer wall and the second outer wall having an inner surface, an outer surface, a first edge and a second edge arranged substantially parallel to each other, and a third edge and a fourth edge arranged substantially parallel to each other;
   at least one inner wall extending between the inner surfaces of the first outer wall and the second outer wall, the at least one inner wall having at least one slot, wherein the first outer wall, the second outer wall and the at least one inner wall are formed of an elastically deformable material; and
   a rib protruding from the outer surface of at least one of the first outer wall and the second outer wall, the rib arranged substantially parallel to the first edge and the second edge.

2. The elastically deformable clip of claim 1, wherein the first outer wall, the second outer wall and the inner wall form an H-shaped cross-section.

3. The elastically deformable clip of claim 1, the rib extending from the third edge to the fourth edge.

4. The elastically deformable clip of claim 1, the rib located approximately equidistant from the first edge and the second edge.

5. The elastically deformable clip of claim 1, wherein the entire clip is a molded component.

6. The elastically deformable clip of claim 1, wherein the at least one slot extends from a first edge of the inner wall to a location closer in proximity to the second edge of the outer walls than the proximity of the rib to the second edge.

7. The elastically deformable clip of claim 1, wherein the elastically deformable clip is configured to mate components of an assembly comprising:
   a first component operatively coupled to the elastically deformable clip; and
   a second component having an aperture engageable with the clip for mating the first component with the second component.

8. The elastically deformable clip of claim 7, wherein the clip assembly is disposed in a vehicle.

9. The elastically deformable clip of claim 7, wherein the first component and the second component are configured to engage each other in a fully engaged condition, wherein the rib is engaged with an aperture wall of the aperture in an over-center position.

10. The elastically deformable clip of claim 9, wherein the entire clip is formed of an elastically deformable material.

11. The elastically deformable clip of claim 10, wherein a portion proximate the first edge of at least one of the first outer wall and the second outer wall is configured to elastically deform during contact with the aperture wall of the second component.

12. The elastically deformable clip of claim 10, further comprising a plurality of elastically deformable clips operatively coupled to the first component and a plurality of apertures of the second component configured to receive the plurality of elastically deformable clips, wherein the fully engaged condition comprises contact interference between the plurality of elastically deformable clips and the plurality of apertures, wherein an amount of deformation of the plurality of elastically deformable clips is averaged in aggregate to elastically average the position of the first component relative to the second component.

* * * * *